US009170110B2

(12) United States Patent
Dewas et al.

(10) Patent No.: US 9,170,110 B2
(45) Date of Patent: Oct. 27, 2015

(54) FLIGHT MANAGEMENT SYSTEM HAVING TRAJECTORY CALCULATION

(71) Applicant: THALES, Neuilly-sur-Seine (FR)

(72) Inventors: Emmanuel Dewas, Frouzins (FR); Pierre-Alain Dubourg, Saint Chamas (FR); Loic Charles, Toulouse (FR)

(73) Assignee: Thales, Courbevoie (FR)

( * ) Notice: Subject to any disclaimer, the term of this patent is extended or adjusted under 35 U.S.C. 154(b) by 239 days.

(21) Appl. No.: 13/902,634

(22) Filed: May 24, 2013

(65) Prior Publication Data

US 2013/0317740 A1 Nov. 28, 2013

(30) Foreign Application Priority Data

May 25, 2012 (FR) ...................................... 12 01503

(51) Int. Cl.
*G01C 21/00* (2006.01)
*G01C 21/20* (2006.01)
*G08G 5/00* (2006.01)

(52) U.S. Cl.
CPC .............. *G01C 21/00* (2013.01); *G01C 21/005* (2013.01); *G01C 21/20* (2013.01); *G08G 5/0052* (2013.01)

(58) Field of Classification Search
CPC ...... G01C 21/00; G01C 21/26; G01S 5/0027; G01S 19/22; G01S 19/47; G01S 19/49
USPC ...................... 701/466, 473, 478.5
See application file for complete search history.

(56) References Cited

U.S. PATENT DOCUMENTS

| 2,749,035 | A | * | 6/1956 | Gray | 701/529 |
|---|---|---|---|---|---|
| 4,104,722 | A | * | 8/1978 | Evans | 701/513 |
| 4,930,085 | A | * | 5/1990 | Kleinschmidt | 701/472 |
| 5,448,486 | A | | 9/1995 | Watland | |
| 5,774,818 | A | * | 6/1998 | Pages | 701/3 |
| 6,405,124 | B1 | * | 6/2002 | Hutton | 701/467 |
| 2005/0261808 | A1 | * | 11/2005 | Artini et al. | 701/3 |
| 2008/0154490 | A1 | * | 6/2008 | Hoofd et al. | 701/202 |
| 2008/0300737 | A1 | * | 12/2008 | Sacle et al. | 701/3 |
| 2008/0300739 | A1 | * | 12/2008 | Coulmeau et al. | 701/8 |
| 2012/0022724 | A1 | * | 1/2012 | Botargues et al. | 701/8 |

OTHER PUBLICATIONS

JC Radix-Masson, "Localisation Inertielle", 1972, pp. 114-116.

* cited by examiner

*Primary Examiner* — Muhammad Shafi
*Assistant Examiner* — Majdi Alsomiri
(74) *Attorney, Agent, or Firm* — Baker & Hostetler LLP

(57) ABSTRACT

A flight management system of an aircraft is provided allowing notably the calculation of a trajectory over the terrestrial globe. The calculation of a trajectory is carried out with respect to a true North, true North being a navigation term referring to the direction of the geographical North pole with respect to a given position. When the current or estimated position of the aircraft is level with the pole, it then becomes impossible to define true North, true North being defined in all the directions or in no direction, depending on the calculation facilities used. The flight management system makes it possible to use a single calculation procedure whatever the current position or the position to be reached of the aircraft on the terrestrial globe.

4 Claims, 3 Drawing Sheets

FLIGHT MANAGEMENT SYSTEM HAVING TRAJECTORY CALCULATION

CROSS-REFERENCE TO RELATED APPLICATION

This application claims priority to foreign French patent application No. FR 1201503, filed on May 25, 2012, the disclosure of which is incorporated by reference in its entirety.

FIELD OF THE INVENTION

The invention lies in the field of flight management systems and more particularly trajectory calculation means.

BACKGROUND

A Flight Management System or FMS is an onboard device, in this instance aboard an aircraft. It allows the computation of an onboard flight plan in the case of rerouting, notably. A flight plan is the detailed description of the route to be followed by an aircraft within the framework of a planned flight. It comprises notably a chronological sequence of waypoints described by their position, their altitude and their overflight time. The waypoints constitute the reference trajectory to be followed by the aircraft with a view to complying best with its flight plan. This trajectory is a valuable aid both to the ground control personnel and also to the pilot, for anticipating the movements of the aircraft, for example an aeroplane, and thus ensuring an optimum safety level, notably within the framework of the maintaining of inter-aircraft separation criteria.

There exist various flight management systems, depending on the type of craft and of application for which it is intended. However, certain elements are common to a majority of flight management systems. Indeed, a flight management system generally comprises a navigation database, a means for recording its flight plan and guidance means.

The navigation database contains all the information necessary for the computation of a flight plan, such as the airways, airports, runways or radio navigation data.

The flight plan recording means comprises an interface on which the pilot can enter all the information necessary for establishing his flight plan.

The trajectory to be followed can be calculated on the basis of the flight plan as well as the whole set of data liable to be useful to the pilot during the flight, such as the transit time at a waypoint, or an estimation of the quantity of fuel aboard.

One of the main tasks of a flight management system is to accurately determine the location of the aircraft. These systems must be capable of operating whatever the position of the craft on the terrestrial globe, commonly defined by a latitude and a longitude.

The calculation of a trajectory is carried out with respect to a true North, true North being a navigation term referring to the direction of the geographical North pole with respect to a given position.

When the current or estimated position of the aircraft is level with a pole, it then becomes impossible to define true North, true North being defined in all the directions or in no direction, depending on the calculation facilities used.

A first solution has been afforded, consisting in using the coordinates of the previous position of the aircraft outside of the polar region used by the flight management system to determine the direction of true North.

This solution makes it necessary to verify for each new position used by the management system whether the position is situated in a polar region, this presenting the drawback of complicating the calculation procedure since this verification requires additional steps.

Another solution has been described in the document by Watland (U.S. Pat. No. 5,448,486) for calculating the position of an aircraft or the angular deviation between the axis of orientation of true North passing through the instantaneous position and the axis passing through the instantaneous position and the estimated position of the aircraft.

When the instantaneous position of the aircraft is situated in a polar region, the invention consists in aligning the polar axis in the plane of the equator. In the embodiment described in the Watland document, the former geographical North pole is called the "Sumatran pole" and is situated at a latitude of 0° and a longitude of 90°.

In another embodiment disclosed in the Watland document, the latitude of the "Sumatran pole" is situated beyond a latitude of 45°, the position error thus incurred being less than 1%.

The solution proposed by Watland presents the drawback of being required, for each of the positions considered, to verify whether the latter is situated in a polar region, and of pivoting the reference frame such as described previously, if appropriate. This solution complicates the positioning calculation and trajectory calculation method.

SUMMARY OF THE INVENTION

An aim of the invention is to propose an alternative flight management system which uses a generic calculation procedure capable of locating an aircraft or of making a flight plan whatever the current position or the estimated position of an aircraft on the terrestrial globe, and notably in the polar regions without complicating the calculation procedure. The invention is particularly beneficial when at least one of the positions, current or to be reached, is situated at the level of a pole. Indeed, in the polar regions, all the positions are regarded as the geographical pole. Stated otherwise, an infinity of meridians passes through the position considered.

According to an aspect of the invention, there is proposed a system for flight management of an aircraft over the terrestrial globe comprising calculation modules suitable for:
using a spherical or ellipsoidal representation of the terrestrial globe,
using input data from among a set comprising a first current position of the aircraft, a second position to be reached, defined by a longitude and a latitude, a first angular deviation separating an axis of orientation of a true North passing through the first position and an axis passing through the first and second positions, a second angular deviation separating an axis of orientation of true North passing through the second position and an axis passing through the first and second positions, a distance separating the first and the second position.
The calculation modules are furthermore suitable for:
testing whether at least one of the said positions is situated in one of the polar regions when at least one of the said positions is used as input datum, and
performing:
the calculation of an angular deviation when the said angular deviation is not used as input datum,
the calculation of the second position when the said second position is not used as input datum, or
the calculation of the distance when the distance is not used as input datum;

(i) the axis of orientation of true North being the axis passing through the position considered from among the first or the second position and the geographical North and oriented towards the geographical North if no position is situated in one of the polar regions, the axis of orientation of true North being the axis directed along the meridian corresponding to the longitude of the position considered from among the first or the second position and oriented towards the geographical North if the position considered is situated in a polar region. As has already been indicated previously, when a position is situated in a polar region, an infinity of meridians passes through this position.

The invention consists notably in fixing, by convention, the orientation of true North $N_{true}$ when the position considered is situated in a polar region.

The flight management system according to an aspect of the invention makes it possible to use a single calculation procedure whatever the current position or the position to be reached of the aircraft on the terrestrial globe.

According to another aspect of the invention, there is proposed an aircraft furnished with a flight management system such as described previously.

BRIEF DESCRIPTION OF THE DRAWINGS

The invention will be better understood on studying a few embodiments described by way of wholly non-limiting examples, and illustrated by appended drawings in which.

DETAILED DESCRIPTION

Figure 1:
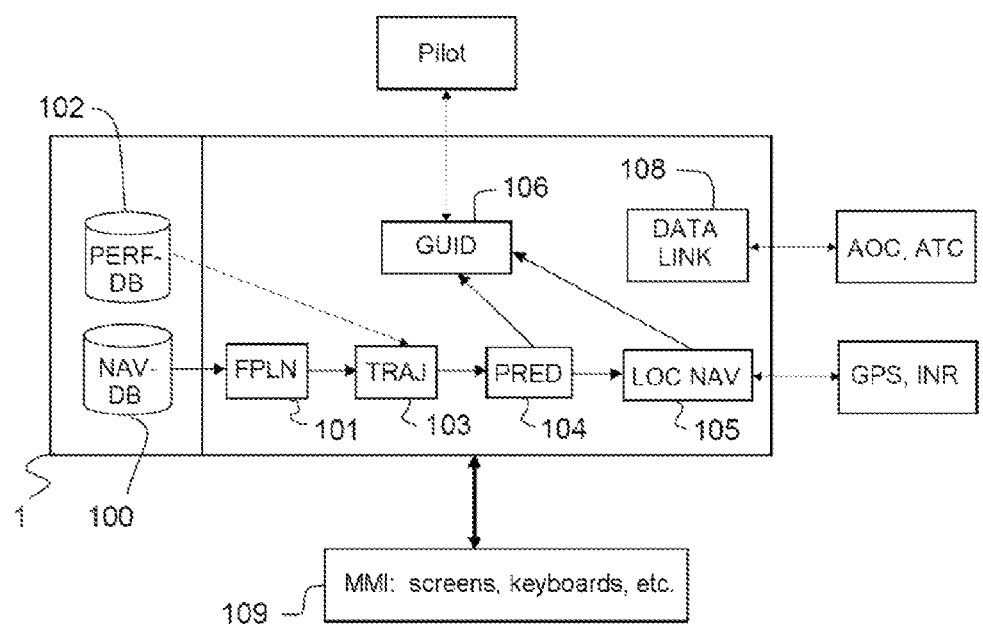
FIG. 1 schematically represents a flight management system, according to one aspect of the invention.

FIG. 1 represents a flight management system 1 comprising:
- databases 100 for constructing geographical routes and procedures with the help of data included in the bases such as the waypoints, beacons, trajectory portions called "legs" defined by several parameters such as setpoints to be followed relating to a position, an altitude or a heading,
- modules 101 for inputting the geographical elements constituting the reference trajectory of the route to be followed,
- databases 102 containing the craft's aerodynamic and engine parameters,
- modules 103 for constructing a continuous trajectory on the basis of points of the flight plan which complies with the performance of the aeroplane and the confinement constraints (RNP),
- modules 104 for constructing an optimized vertical profile on the lateral trajectory,
- modules 105 for performing aircraft location as a function of the geolocation means of GPS (registered trademark), Galileo (registered trademark), VHF radio beacons or inertial rigs type,
- modules 106 for guiding in the lateral planes the aircraft on its 3D trajectory, while optimizing the speed,
- modules 108 for communicating with the control centres and other aircraft,
- a user interface 109 comprising a keyboard, at least one screen makes it possible to enter the necessary data and to view the results.

The pilot of the aircraft uses the databases 100 in cooperation with the module 101 to construct his flight plan and record these various waypoints so as to compute the structure of the route to be followed by the aircraft.

The module 103 integrates the structure of the route to be followed computed by the pilot and associates therewith information, provided by the database 102, relating to the performance of the aircraft and thus making it possible to define a trajectory which complies with the performance of the aircraft. On the basis of this trajectory, the module 104 constructs an optimized vertical profile.

The module 105 locates the aircraft whatever its position on the terrestrial globe, the geolocation data are transmitted to a module 106 for assisting the pilot or the automatic piloting making it possible to guide the aircraft on its 3D trajectory. The communication modules 108 make it possible to transmit the flight plan as well as the instantaneous information on the location of the aircraft to the control centres or to other aircraft.

Figure 2:
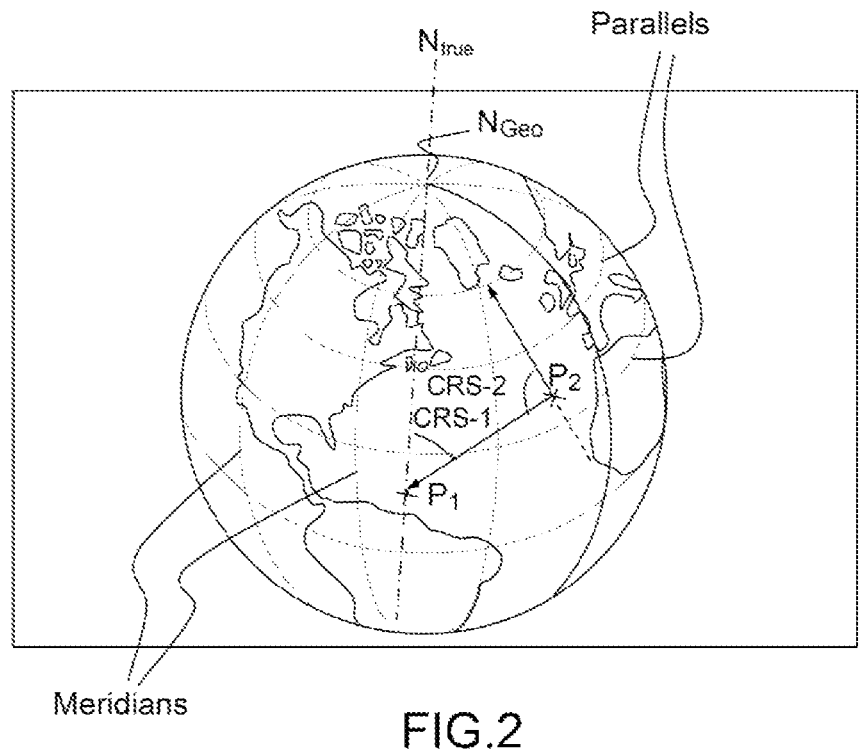
FIG. 2 illustrates a spherical representation of the terrestrial globe on which the input data are represented, according to one aspect of the invention.

FIG. 2 is a graphical representation of the input data used by the flight management system.

The terrestrial globe is represented in a spherical manner, the coordinates of the positions of the aircraft are defined by a longitude and a latitude.

True North $N_{true}$ is i a direction defined by an axis passing through the first current position P1 of the aircraft and the geographical North pole $N_{Geo}$, when neither the first current position P1 nor the second position P2 to be reached of the aircraft is situated in one of the polar regions (PN; PS) such as they are defined.

When one or both positions are situated in a polar region, this or these positions are regarded as the geographical pole, true North $N_{true}$ is then not definable.

The first position P1 is the current or estimated position of the aircraft with coordinates (Lat1; Long1), the second position P2 is the position to be reached by the aircraft from the first position, with coordinates (Lat2; Long2).

The course 1 denoted CRS1 corresponds to the angular deviation between the axis of true North $N_{true}$ passing through the first current or estimated position P1 of the aircraft and the axis passing through the first current or estimated position P1 and the second position P2 to be reached of the aircraft.

The course 2 denoted CRS2 corresponds to the angular deviation between the axis of true North passing through the second position P2 to be reached of the aircraft and the axis passing through the first current position P1 and the second position P2 to be reached of the aircraft.

The distance d is the distance separating the first current position P1 from the second position P2 to be reached of the aircraft.

The flight management system can use two basic calculations to define a trajectory of the aircraft over the terrestrial globe:
- either a first calculation of angular deviation between the axis of orientation of true North $N_{true}$ and the axis passing through the first P1 and the second P2 position,
- or a second calculation of coordinates of the second position P2 to be reached.

The first basic calculation consists in determining the course 1 CRS1 and/or the course 2 CRS2 on the basis of the first current or estimated position P1 and of the second position P2 to be reached of the aircraft.

The second basic calculation consists in determining the second position P2 to be reached on the basis of the first current position P1 of the aircraft, of the course 1 CRS1 and of the distance d.

The difficulty resides in the definition of true North $N_{true}$ when the first current or estimated position P1 or the second position P2 to be reached is situated in a polar region PN, PS such as defined, it not being possible to define true North $N_{true}$ in a unique manner.

The invention therefore consists in establishing a convention making it possible to define the direction of true North $N_{true}$ with respect to a first current or estimated position P1 or a second position P2 to be reached situated in a polar region PN, PS.

Figure 3:
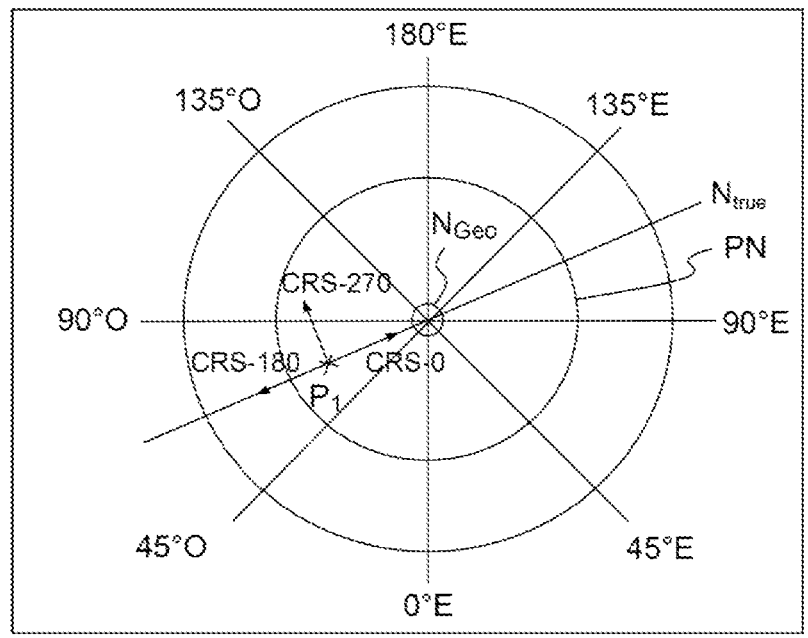
FIG. 3 represents an angular deviation benchmark defining the North pole in the North polar region, according to one aspect of the invention.

FIG. 3 represents a course benchmark for the North pole PN, according to one aspect of the invention.

FIG. 3 represents the North polar region wherein is situated a first current position P1 of the aircraft with coordinates (Lat1; Long1).

The preliminary step for the computation of a flight management system according to an aspect of the invention is to define the polar regions.

A new constant denoted $Lat_{max}$ is therefore introduced, corresponding to the latitude beyond which a position is situated in the North polar region PN. This latitude is defined by the latitude of the geographical North pole $N_{Geo}$, in this instance 90°, from which is removed the angular deviation at the earth's centre from which it is no longer possible to distinguish two points a distance $D_{min}$ apart. Typically the distance $D_{min}$ is of the order of about ten meters.

Thus, $Lat_{max}=90°-D_{min}/R_T$; $R_T$ being the terrestrial radius.

To define true North $N_{true}$ with respect to a first current position P1 (Lat1; Long1) situated in the North polar region PN, it is established that the direction of the meridian corresponding to the longitude Long1 of the first current position P1 oriented towards the geographical South defines the course 1 equal to 180° CRS1=180°.

Thus, CRS1=0° is readily deductible from CRS1=180° and corresponds to the direction of true North at the current position P1 of the aircraft oriented towards the geographical North $N_{Geo}$.

To define true North $N_{true}$ with respect to a first current or estimated position P1 (Lat1; Long1) situated in the South polar region, it is established that the direction of the meridian corresponding to the longitude Long1 of the first current or estimated position P1 oriented towards the geographic North $N_{Geo}$ defines the course 1 equal to 0° CRS1=0°.

These conventions apply for performing the first or the second basic calculation. The position P2 to be reached may be situated in a polar or non-polar region.

The same convention is used to define true North $N_{true}$ with respect to the second position P2 to be reached.

The established conventions make it possible to define true North $N_{true}$ whatever the positions of the first current or estimated position P1 and of the second position P2 to be reached, it is possible to perform the first basic calculation making it possible to determine the courses CRS1 and CRS2 on the basis of the coordinates of the first P1 and of the second P2 position.

If the first position P1 of the aircraft is situated in the North polar region, stated otherwise, if the value of the latitude Lat1 is greater than the latitude $Lat_{max}$ above which a position is situated in the North polar region PN, the course value CRS1 is calculated thus: CRS1=180−(Long1−Long2).

If the first position P1 of the aircraft is situated in the South polar region, stated otherwise, if the value of the latitude Lat1 is less than the opposite of the latitude $Lat_{max}$ below which a position is situated in the South polar region PS, the course value CRS1 is calculated thus: CRS1=Long2−Long1.

If the second position P2 of the aircraft is situated in the South polar region, stated otherwise, if the value of the latitude Lat2 is less than the opposite of the latitude $Lat_{max}$ below which a position is situated in the South polar region PS, the course value CRS2 is calculated thus: CRS2=180−(Long2−Long1).

If the second position P2 of the aircraft is situated in the North polar region, stated otherwise, if the value of the latitude Lat2 is greater than the value of the latitude $Lat_{max}$ above which a position is situated in the North polar region PN, the course value CRS2 is calculated thus: CRS2=Long1−Long2.

The established conventions make it possible to define true North $N_{true}$ whatever the positions of the first current position P1 and of the second position P2 to be reached, it is possible to perform the second calculation of the coordinates of the second position P2 on the basis of the coordinates of the first position P1, of the course CRS1 and of the distance d.

The latitude Lat2 of the second position P2 is calculated on the basis of a generic trajectory calculation procedure. The choice of the meridian for defining true North $N_{true}$ does not influence the value of the latitude Lat2.

On the other hand, the value of the longitude Long2 depends on the presence or otherwise of the position P1 or P2 in a polar region.

Indeed, if the absolute value of the latitude of the second position P2 to be reached is greater than the latitude $Lat_{max}$ above which P2 is situated in a polar region, stated otherwise, if the second position P2 is situated in the North or South polar region then the longitude of the position P2 is equal to the longitude of the position P1 i.e. Long2=Long1. The presence or otherwise of the position P1 in a polar region in this case is not a determining factor.

If the absolute value of the latitude of the second position P2 to be reached is less than the latitude $Lat_{max}$ above which P2 is situated in a polar region, stated otherwise, if the second position P2 is not situated in a polar region and if the first position P1 is situated in the North polar region, stated otherwise, if the latitude Lat1 is greater than the latitude $Lat_{max}$, the longitude Long2 of the position P2 is calculated thus: Long2=Long1+180−CRS1.

If the absolute value of the latitude of the second position P2 to be reached is less than the latitude $Lat_{max}$ above which P2 is situated in a polar region, stated otherwise, if the second position P2 is not situated in a polar region and if the first position P1 is situated in the South polar region, stated otherwise, if the latitude Lat1 is less than the opposite of the latitude $Lat_{max}$, the longitude of the position P2 is calculated thus: Long2=Long1+CRS1.

Because of the roundness of the terrestrial globe, the meridians which are regarded as being parallel with respect to one another at the level of the equator converge at the levels of the poles.

In order to preserve the orientation of a course between a first current position P1 and a second position P2 to be reached, it is necessary to correct the course.

The work "techniques inertielles J C Radix-Masson 1972" defines a current course on the basis of an initial course, of the measurements of the rotation speed of a platform reference frame of the rig about its vertical axis $w_{rz}$, of the longitude and of the latitude.

$$CRS = CRS_0 + \int_{0 \ldots t} (\omega_{rz} + \dot{G}\sin L)dt$$

with G the longitude and L the latitude

In a first assumption, the platform reference frame of the rig used does not rotate about its vertical axis, the platform not being slaved to point North permanently, thus $\omega_{rz}=0$.

In a second assumption, we consider high latitudes, consequently sin L varies little, it is then possible to regard sin L as a constant [sin (0.5*(Lat 1+Lat2)].

With the aid of the calculation assumptions presented hereinabove, the previous formula can be simplified thus:

$$CRS2=CRS1+(\text{Long}2-\text{Long}1).\sin [(\text{Lat}1+\text{Lat}2)/2].$$

If the two positions P1 and P2 are situated in a polar region, the latitude of the position P1 and of the position P2 are considered to be equal. At the North pole, the relation becomes CRS2=CRS1+Long2+Long1 and at the South pole, the relation becomes CRS2=CRS1+Long1−Long2.

According to an aspect of the invention, true North is a direction which changes as a function of the position of the point considered. It may be beneficial, for the pilot of an aircraft to locate himself with respect to a fixed benchmark.

The grid convention makes it possible in proximity to the poles to work with a fixed course benchmark, whatever the position of the first current position P1 or of the second position P2 to be reached.

Figure 4:
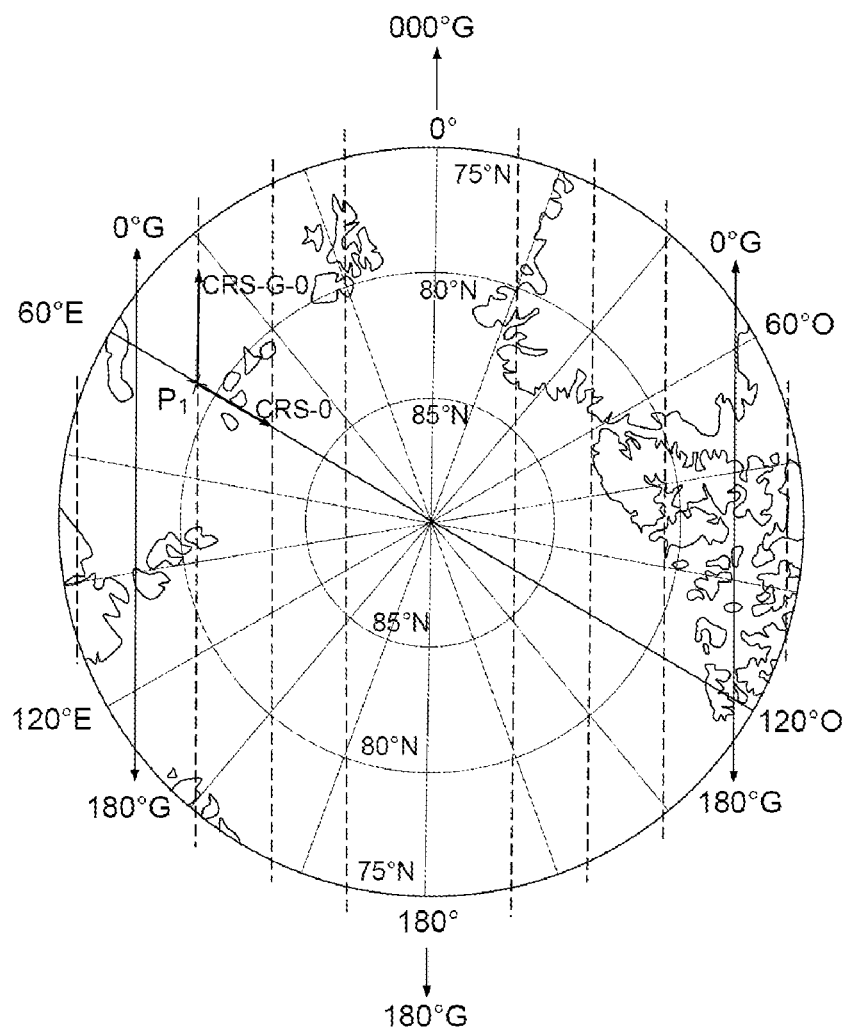
FIG. 4 represents true North according to the invention and true North according to a grid convention.

FIG. 4 represents the polar region comprising a reference frame consisting of the meridians and of parallels and on which a second reference frame called the grid convention is overlaid.

According to the grid convention, true North $N_{true}$ is the axis parallel to the Greenwich meridian and passing through the position considered from among the first P1 and the second P2 position.

It is possible to convert a course according to an aspect of the invention into a course according to the grid convention.

Thus, in the North polar region PN, a course according to the grid convention can be calculated thus:

$$CRS\_G=CRS-\text{Long}+180$$

In FIG. 4, a position P1 with coordinates (Lat1; Long1) is represented, in this instance Long1 is equal to 60°.

The course denoted CRS_G_0 according to the grid convention corresponds to the straight line parallel to the Greenwich meridian and passing through the position P1.

According to an aspect of the invention, the course CRS_G_0 corresponds to the course 240°.

According to the previous relation, a longitude Long1 of 60° is indeed retrieved.

Thus, it is possible to switch from the benchmark according to the invention to the benchmark according to the grid convention.

The flight management system according to an aspect of the invention can also be applied to an ellipsoidal representation of the terrestrial globe.

The flight management system according to an aspect of the invention defines true North $N_{true}$ whatever the position considered of the aircraft and makes it possible to perform one or the other of the basic calculations necessary for the computation of a flight plan, for example.

The flight management system according to an aspect of the invention allows the use of a generic calculation procedure for all the positions of the aircraft on the terrestrial globe whereas customarily, this type of system was not able to operate when the aircraft was situated in a polar region.

The invention claimed is:

1. A system for flight management of an aircraft over the terrestrial globe comprising calculation modules configured for:

using a spherical or ellipsoidal representation of the terrestrial globe, using input data from among a set comprising a first current position of the aircraft, a second position to be reached, defined by a longitude and a latitude, a first angular deviation separating an axis of orientation of a true North passing through the first position and an axis passing through the first and second positions, a second angular deviation separating an axis of orientation of true North passing through the second position and an axis passing through the first and second positions, and a distance separating the first position and the second position, wherein the said calculation modules are further configured for:

testing whether at least one of the said positions is situated in one of the polar regions when at least one of the said positions is used as the input data to at least one of the calculation modules, and performing:

calculation of an angular deviation when the said angular deviation is not used as the input data to at least one of the calculation modules, calculation of the second position when the second position is not used as the input data to at least one of the calculation modules, or calculation of the distance when the distance is not used as the input data to at least one of the calculation modules, wherein the calculations are performed with respect to an axis of orientation of true North;

wherein the axis of orientation of true North being the axis passing through the position considered from among the first position or the second position and the geographical North and oriented towards the geographical North if no position is situated in one of the polar regions; and wherein the axis of orientation of true North being the axis directed along the meridian corresponding to the longitude of the position considered from among the first position or the second position and oriented towards the geographical North if the position considered is situated in a polar region.

2. The system according to claim 1, wherein the calculation modules use a first calculation of angular deviation between the axis of orientation of true North in a position considered from among the first position and the second position and the axis passing through the first and the second position or a second calculation of the coordinates of the second position to be reached on the basis of the coordinates of the first current position, of the first angular deviation and of the distance.

3. A management system according to claim 1, wherein the polar regions are regions where the latitude is greater than a predetermined value.

4. An aircraft comprising with a flight management system comprising calculation modules configured for:

using a spherical or ellipsoidal representation of the terrestrial globe, using input data from among a set comprising a first current position of the aircraft, a second position to be reached, defined by a longitude and a latitude, a first angular deviation separating an axis of orientation of a true North passing through the first position and an axis passing through the first and second positions, a second angular deviation separating an axis of orientation of true North passing through the second position and an axis passing through the first and second positions, and a distance separating the first position and the second position, wherein the said calculation modules are further configured for:

testing whether at least one of the positions is situated in one of the polar regions when at least one of the positions is used as the input data to at least one of the calculation modules, and performing:

calculation of an angular deviation when the angular deviation is not used as the input data to at least one of the calculation modules, calculation of the second position when the second position is not used as the input data to at least one of the calculation modules, or calculation of the distance when the distance is not used as the input data to at least one of the calculation modules, wherein the calculations are performed with respect to an axis of orientation of true North:

wherein the axis of orientation of true North being the axis passing through the position considered from among the first position or the second position and the geographical North and oriented towards the geographical North if no position is situated in one of the polar regions; and wherein the axis of orientation of true North being the axis directed along the meridian corresponding to the longitude of the position considered from among the first position or the second position and oriented towards the geographical North if the position considered is situated in a polar region.

* * * * *

UNITED STATES PATENT AND TRADEMARK OFFICE
CERTIFICATE OF CORRECTION

PATENT NO.        : 9,170,110 B2
APPLICATION NO.   : 13/902634
DATED             : October 27, 2015
INVENTOR(S)       : Emmanuel Dewas et al.

It is certified that error appears in the above-identified patent and that said Letters Patent is hereby corrected as shown below:

In the claims:

Column 8, In lines 18-19 of claim 1, please replace "testing whether at least one of the said positions is situated in one of the polar regions when at least one of the said positions" with --testing whether at least one of the positions is situated in one of the polar regions when at least one of the positions--.

Column 8, In line 1 of claim 4, please replace "aircraft comprising with a flight" with --aircraft comprising a flight--.

Signed and Sealed this
Twenty-second Day of March, 2016

Michelle K. Lee
*Director of the United States Patent and Trademark Office*